United States Patent [19]
Carmack

[11] Patent Number: 5,123,143
[45] Date of Patent: Jun. 23, 1992

[54] CASTOR COVER

[76] Inventor: David W. Carmack, 15740 Ambiance Dr., Gaithersburg, Md. 20878

[21] Appl. No.: 681,969

[22] Filed: Apr. 8, 1991

[51] Int. Cl.⁵ .............................................. B60B 33/00
[52] U.S. Cl. .................................................. 16/18 CG
[58] Field of Search ...................... 16/18 CG; 294/171

[56] References Cited

U.S. PATENT DOCUMENTS

| | | | |
|---|---|---|---|
| 2,547,343 | 4/1951 | O'Loughlin | 294/171 |
| 3,922,754 | 12/1975 | Anderson | 16/18 CG |
| 4,077,088 | 3/1978 | Melara | 16/18 CG |

FOREIGN PATENT DOCUMENTS 1235049  5/1960  France .............................. 294/171

Primary Examiner—Robert L. Spruill
Assistant Examiner—Carmine Cuda

[57] ABSTRACT

A flexible tubular material to cover a castor. This castor cover has base edges (8) for resting against the floor, a hole (2) diametrically opposite base edges (8) to allow castor stem to pass through to furniture attachment, a slit (4) cut through invention's convex side from hole (2) to one base edge (8) for installation.

3 Claims, 3 Drawing Sheets

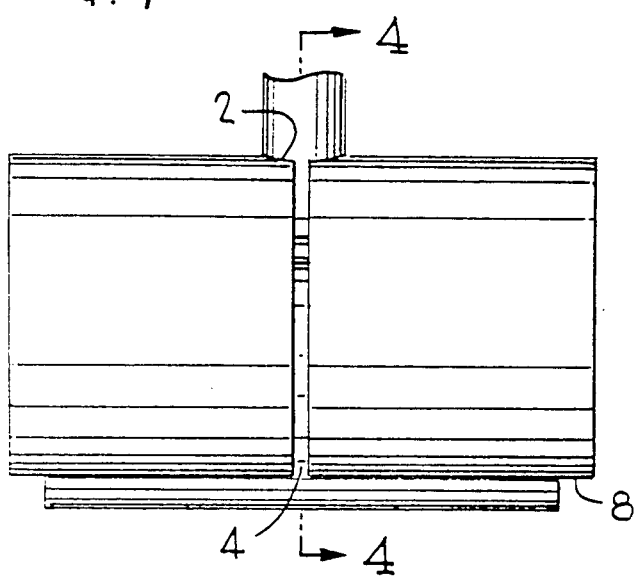
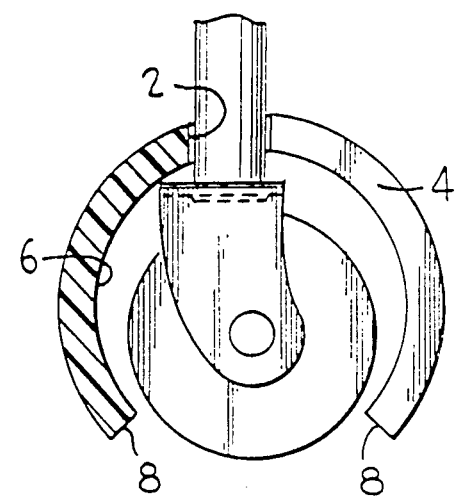
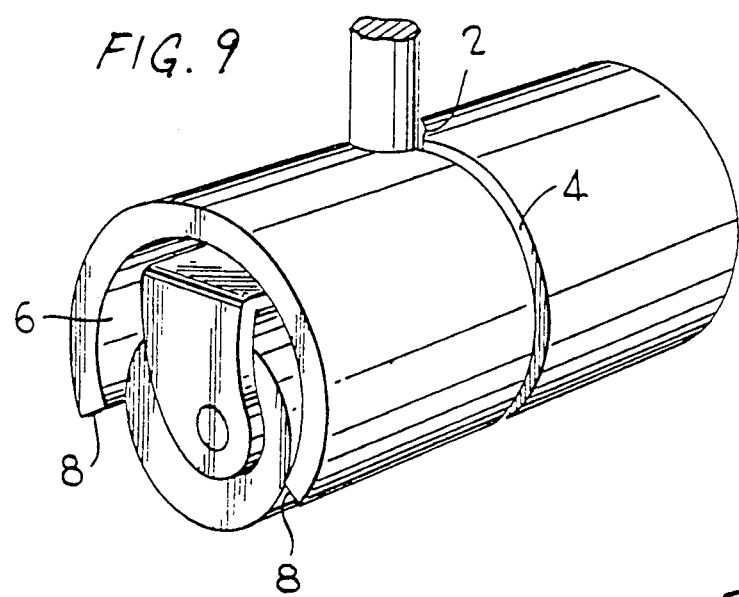
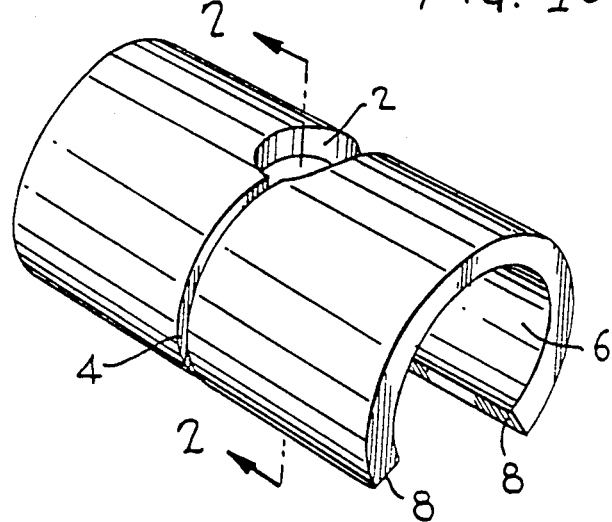

CASTOR COVER

BACKGROUND—FIELD OF INVENTION

This invention relates to furniture, and specifically to castors and castor coverings.

OBJECTS AND ADVANTAGES

The primary object of the castor cover is to provide a means of reducing or avoiding bodily injury if accidental collision with castor occurs. Another object of the castor cover is to protect the castor from damage if accidental collision occurs. These objectives will be met due to the composition of the castor cover. The castor cover is made of a cushiony, flexible, pliable substance.

Advantages of the castor cover are a low cost, light weight, durable, reliable, and easy to install covering that will create a safe enviroment.

Further Objects and Advantages of the invention will become apparent from a consideration of the drawings and ensuing description.

SUMMARY OF INVENTION

The subject invention is a castor cover which has a generally cylindrical shape. Composition of castor cover is pliable, spongy, flexible, semirigid substance to provide a cushioning effect. The material used for this invention is of such quality to ensure durability and longevity. The cylinder is formed such that the middle is removed to form a tube. The tube can be various sizes for the different size castors.

The tube has a section (approximately 20 percent) removed from its convex side to form the two BASE EDGES. These base edges will contact the floor surface. Opposite the base on the convex side is a HOLE. The HOLE allows the castor stem to pass through the castor cover up to the bed frame. From the HOLE to one of the BASE EDGES is a SLIT cut into the tube's convex side. This SLIT will allow the castor cover to be flexed open temporarily for installation around the castor.

DESCRIPTION OF DRAWINGS

In the Drawings the invention is shown in various orientations.

FIG. 7 shows the castor cover installed on castor.

FIG. 8 shows the castor cover installed on castor.

FIG. 9 shows the castor cover installed on castor.

FIG. 10 shows another embodiment of the castor cover with a longitudinal slit (4a).

DETAILED DESCRIPTION OF PREFERRED EMBODIEMENT

Figure 1:
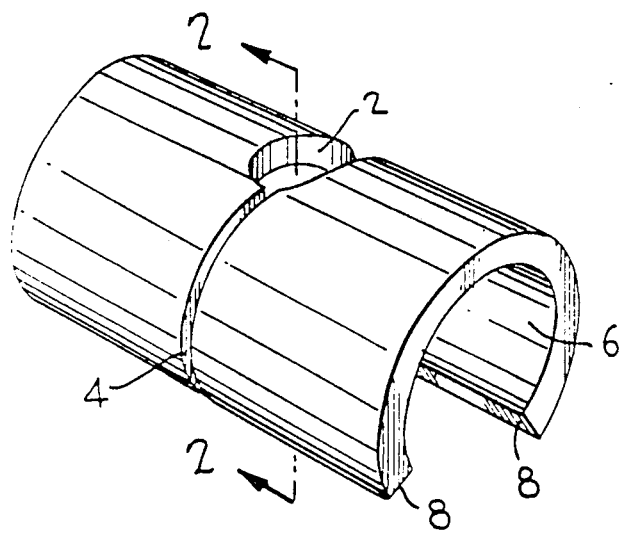
FIG. 1 shows the castor cover's front, top and side. The front has a SLIT (4), the top has a HOLE (2).
Figure 2:
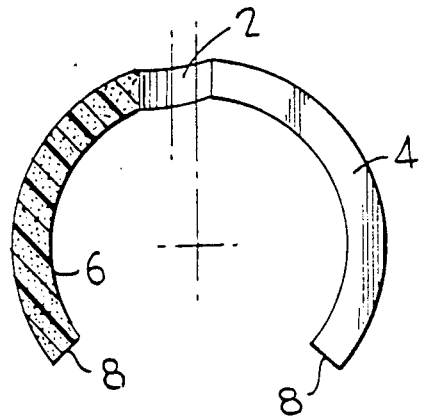
FIG. 2 shows the castor cover from a side view looking into the invention.
Figure 3:
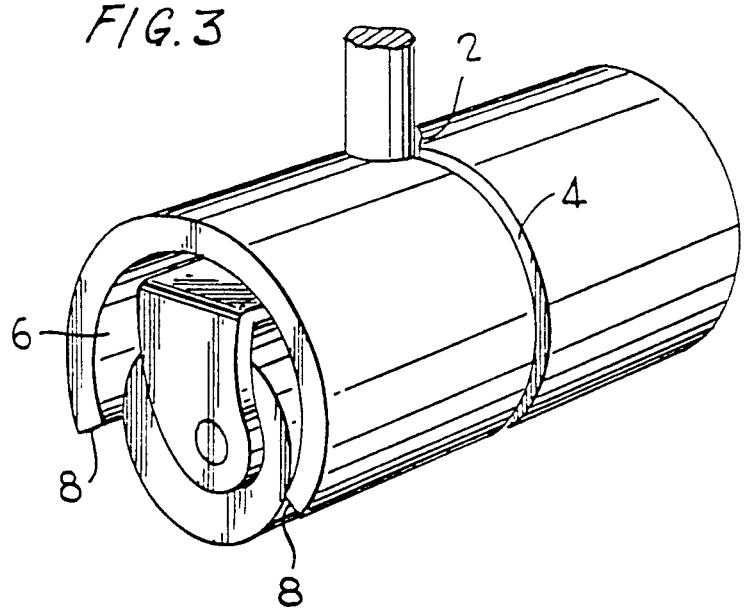
FIG. 3 shows the castor cover from the bottom. A INSIDE SURFACE (6) can be seen. The BASE EDGES (8) are shown also.
Figure 4:
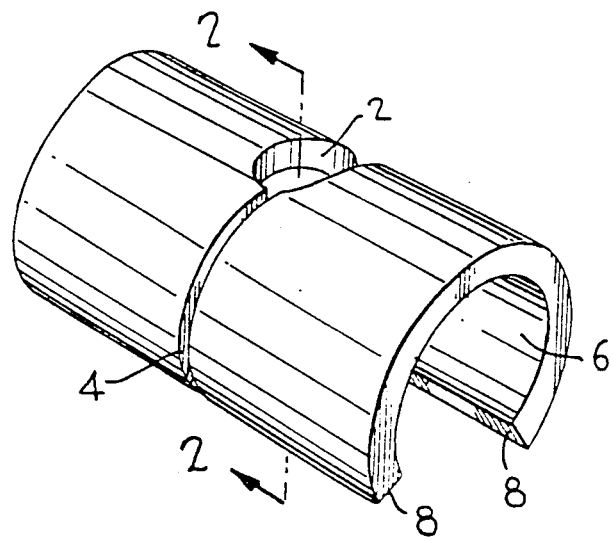
FIG. 4 shows the castor cover's top view.
Figure 5:
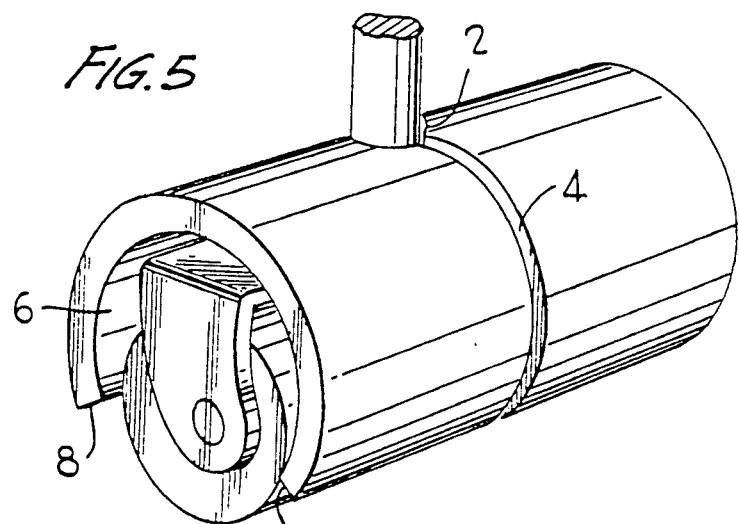
FIG. 5 shows the castor cover's top and side.
Figure 6:
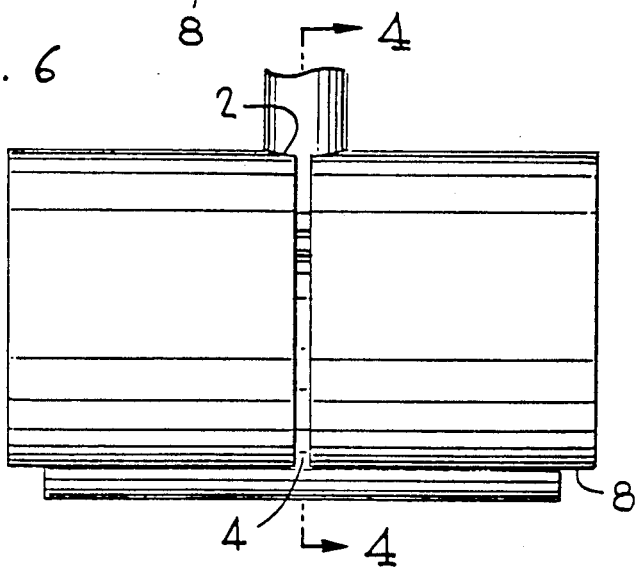
FIG. 6 shows the castor cover's front.

The Castor Cover protects the castor and/or objects that collide with castor by covering and surrounding castor with a spongy, semirigid material. Suggested materials for the castor cover are foam rubber, synthetic rubber, neoprene rubber. The castor cover is a tubular "C" shaped semicircle. This castor cover is installed over the castor and around the castor stem/bed frame attachment. With the castor cover installed the castor is now covered and surrounded. When bumped the castor cover is contacted and then springs back into its original shape. While the castor is covered by this castor cover, damage to castor and/or foreign objects is reduced or avoided due to the invention's composition and design.

SUMMARY, RAMIFICATIONS, AND SCOPE

Accordingly, the reader will see that the castor cover invention provides protection for the castor and objects that collide with castor. This castor cover is durable for longevity, economical, easy to install and maintenance free after installation.

While the preceding description contains many specificities, these should not be construed as limitations on the scope of the invention, but rather as an exemplification of one preferred embodiment thereof. Many other variations are possible.

Therefor, the scope of the invention should be determined not by the embodiment illustrated, but by the appended claims and their legal equivalents.

I claim:

1. A protective cover comprising a semi-rigid, foam cylinder with an opening along the bottom of said cylinder to form two base edges, a hole in said cylinder diametrically opposite said base edges and equal distance from each end for a castor support shaft to pass through, and a circumferential slit in said cylinder from said hole to one said base edge, whereby enclosing a castor creating a protective device to prevent or reduce injury when collision occurs with the castor.

2. A protective cover comprising a semi-rigid, foam cylinder with an opening along the bottom of said cylinder to form two base edges, a hole in said cylinder diametrically opposite said base edges and equal distance from each end for a castor support shaft to pass through, and a slit in said cylinder opposite and parallel to said base edges cut from said hole to end of said cylinder, whereby enclosing a castor creating a protective device to prevent or reduce injury when collision occurs with the castor.

3. A protective cover comprising a semi-rigid, foam cylinder with an opening along the bottom of said cylinder to form two base edges, a hole in said cylinder diametrically opposite said base edges and equal distance from each end for a castor support shaft to pass through, whereby enclosing a castor creating a protective device to prevent or reduce injury when collision occurs with the castor.

* * * * *